US011369249B2

(12) United States Patent
Vesterager

(10) Patent No.: US 11,369,249 B2
(45) Date of Patent: Jun. 28, 2022

(54) SYSTEM AND METHOD FOR DISSOLVING DETERGENT TABLETS OR GRANULATE

(71) Applicant: Graff Pehrson Vesterager GmbH, Weissenborn (DE)

(72) Inventor: Niels Ole Vesterager, Elpersbuttel (DE)

(73) Assignee: Graff Pehrson Vesterager GmbH, Weißenborn (DE)

(*) Notice: Subject to any disclaimer, the term of this patent is extended or adjusted under 35 U.S.C. 154(b) by 496 days.

(21) Appl. No.: 15/501,464

(22) PCT Filed: Aug. 6, 2015

(86) PCT No.: PCT/EP2015/068165
§ 371 (c)(1),
(2) Date: Feb. 3, 2017

(87) PCT Pub. No.: WO2016/020479
PCT Pub. Date: Feb. 11, 2016

(65) Prior Publication Data
US 2017/0216782 A1    Aug. 3, 2017

(30) Foreign Application Priority Data

Aug. 6, 2014  (EP) .................................... 14179978

(51) Int. Cl.
*A47L 15/44*   (2006.01)
*B01F 21/00*   (2022.01)
(Continued)

(52) U.S. Cl.
CPC ........ *A47L 15/4436* (2013.01); *B01F 21/501* (2022.01); *C02F 1/688* (2013.01);
(Continued)

(58) Field of Classification Search
CPC .... A47L 15/4436; A47L 15/44; B01F 1/0027; B01F 21/501; B01F 21/504; C02F 1/688; C02F 1/68
See application file for complete search history.

(56) References Cited

U.S. PATENT DOCUMENTS 2,296,055 A * 9/1942 Ray .................... A47L 15/4436
137/133
4,662,387 A * 5/1987 King, Sr. ................ C02F 1/688
137/268
(Continued)

FOREIGN PATENT DOCUMENTS

DE         845792 C      8/1952
EP      2777473 B1 *    9/2016  ......... A47L 15/0055
(Continued)

OTHER PUBLICATIONS

Machine translation of WO 2008077437 A1, dated Jul. 2008. (Year: 2008).*

*Primary Examiner* — Joseph L. Perrin
*Assistant Examiner* — Kevin G Lee
(74) *Attorney, Agent, or Firm* — Cooper & Maersch LLC; Lorri Cooper

(57) ABSTRACT

The present invention relates to a system for dissolving at least one detergent tablet or detergent granulate in water and thereby creating a detergent liquid, said system comprising a chamber (103) for dissolving said tablets or granulate, wherein said chamber comprises an opening (105) for receiving said detergent tablet and said water and a detergent liquid outlet (135, 137). The chamber further comprises an inner colander (125) for positioning said at least one tablet or detergent granulate. Thereby, a very efficient dissolving process can be performed, and a uniform detergent liquid is obtained. By positioning the tablets or granulate inside the
(Continued)

colander, it is ensured that all sides of the tablet are in contact with the liquid in the chamber.

20 Claims, 5 Drawing Sheets

(51) Int. Cl.
*C02F 1/68* (2006.01)
*B01F 25/50* (2022.01)
*B01F 21/20* (2022.01)
*B01F 101/00* (2022.01)

(52) U.S. Cl.
CPC ............... *B01F 21/20* (2022.01); *B01F 25/50* (2022.01); *B01F 2101/4505* (2022.01)

(56) References Cited

U.S. PATENT DOCUMENTS

| | | | | |
|---|---|---|---|---|
| 5,078,301 A | * | 1/1992 | Gladfelter | ............... C11D 7/06 222/52 |
| 5,137,694 A | | 8/1992 | Copeland et al. | |
| 5,393,502 A | * | 2/1995 | Miller | ....................... B01F 1/00 239/468 |
| 5,435,157 A | * | 7/1995 | Laughlin | ............... D06F 39/022 137/889 |
| 5,468,377 A | * | 11/1995 | Clavin | .................... C02F 1/688 210/101 |
| 6,779,539 B1 | * | 8/2004 | Schwamberger | ....... C02F 1/688 137/1 |
| 2002/0147124 A1 | | 10/2002 | Klos et al. | |
| 2005/0244315 A1 | | 11/2005 | Greaves et al. | |
| 2012/0138544 A1 | * | 6/2012 | Barani | .................... C02F 1/688 210/744 |
| 2013/0074942 A1 | * | 3/2013 | Stingl | ................. A47L 15/4436 137/4 |
| 2014/0217038 A1 | * | 8/2014 | Lane | ....................... C02F 1/688 210/764 |
| 2015/0151982 A1 | * | 6/2015 | Ferrari | .................... C02F 1/688 210/739 |
| 2016/0120391 A1 | * | 5/2016 | Freudenberg | ......... A47L 15/449 134/56 D |

FOREIGN PATENT DOCUMENTS

| | | | | |
|---|---|---|---|---|
| EP | 2654546 B1 | 9/2017 | | |
| FR | 1431788 A | 3/1966 | | |
| GB | 2087753 A | 6/1982 | | |
| WO | WO-9221808 A1 | * 12/1992 | ......... A47L 15/4436 |
| WO | WO-02079101 A1 | * 10/2002 | .............. C02F 1/008 |
| WO | 2008077437 A | 7/2008 | | |
| WO | 20160020479 A1 | 2/2016 | | |

* cited by examiner

SYSTEM AND METHOD FOR DISSOLVING DETERGENT TABLETS OR GRANULATE

FIELD OF THE INVENTION

The present invention relates to a system and a method for dissolving at least one detergent tablet or detergent granulate in water and thereby creating a detergent liquid.

BACKGROUND

Instead of using liquid concentrate detergent and diluting this e.g. to be used when cleaning, rinsing or the like, it has become more and more common to use detergent tablets or granulate. Detergent tablets or granulate have significant advantages over liquid concentrate detergent including easier transport, less space consumption, and longer durability. Further, the use of detergent granulate or tablets is also less sensitive to extreme temperature, e.g. very cold or hot climates do not influence the quality of the granulate ion of the tablets to the same extent as it would influence the quality of liquid concentrate. Additionally, the concentration of the liquid concentrate can be chosen freely, simply by varying the amount of liquid added to the tablets.

A problem of using detergent tablets or granulate is to ensure an efficient dissolving process, where the obtained liquid detergent has uniform properties, and where the properties of the resulting liquid detergent can be controlled.

It is an object of the present invention to identify a system and a method of dissolving detergent tablets or granulate solving said problem.

FR1431788, US20050244315 and GB2087753 all disclose a system for dissolving solid material to obtain a detergent. A problem of all these solutions is that a precise predefined concentration of the detergent cannot be obtained.

GENERAL DESCRIPTION

In accordance with the invention, there is provided a system for dissolving at least one detergent tablet or detergent granulate in water and thereby creating a detergent liquid, said system comprising a chamber for dissolving said tablets or granulate, wherein said chamber comprises an opening for receiving said detergent tablet and said water, a detergent liquid outlet, said chamber further comprising an inner colander for positioning said at least one tablet or detergent granulate.

Thereby, a very efficient dissolving process can be performed, and a uniform detergent liquid is obtained. By positioning the tablets or granulate inside the colander, it is ensured that all sides of the tablet are in contact with the liquid in the chamber. Throughout this document, an inner colander is described. A colander can be any type of element, which can hold the tablets or granulate, while they are being dissolved, thus avoiding that the granulate or tablets fall to the bottom of the chamber. Such colanders supporting the tablets or granulate during the dissolving process could e.g. be water-dissolvable foil, a support frame or stand, a standard sieve having holes smaller than the size of the granulate or the tablets, and the colander could also be a roughly woven textile bag.

The system further comprises means for assisting the dissolving process and further comprises, a measurement device for measuring the conductivity of the detergent liquid.

Thereby, the intensity of the detergent liquid can be ensured at a predefined level by measuring the conductivity and e.g. facilitating dissolving, when a higher conductivity is needed.

In an embodiment, the means for assisting the dissolving process could solely be the flow of inlet water through the chamber e.g. at the lower part of the chamber past the material in the colander in the chamber, whereby the material is dissolved, and detergent liquid can leave the chamber from an outlet positioned at another position at the chamber. Thereby, the flow from water inlet to detergent liquid outlet provides sufficient flow for an effective dissolving process.

In an embodiment, the means for facilitating the dissolving process comprises a circulation channel input opening and output opening, a circulation unit connected to said chamber and comprising a circulation channel connected to said input opening and output opening on said chamber, said unit further comprising a pump element for sucking liquid from the output opening of the chamber, through the channel and into the input opening of the chamber, a heating unit for heating the liquid in said chamber, In an embodiment, the heating unit is comprised in said circulation unit and adapted to heat the liquid in said chamber by heating liquid passing through said circulation channel.

Thereby, the heating of the liquid can easily be made and easily implemented in the system.

In an embodiment, the chamber comprises a water inlet for connecting to a water supply.

Thereby, water can be added to the chamber in a simple manner.

In an embodiment, the system further comprises a mixing unit, such as a venturi nozzle, for mixing the detergent liquid from the chamber with water.

Thereby, the detergent liquid can be further diluted e.g. if the detergent liquid is for cleaning, then the further dilution ensures that the output can be used for the actual cleaning process.

In an embodiment, the system comprises a measurement device for measuring the conductivity of the liquid from the mixing unit.

By measuring the conductivity, the intensity of the detergent liquid can be determined, and dissolving more of the detergent tablet in the liquid would increase the intensity, whereas adding water would lower the intensity.

In an embodiment, the chamber comprises a first motor controlled valve outlet and a second motor controlled valve outlet positioned at the upper and lower parts of said chamber, respectively.

Thereby, depending on the amount of detergent liquid in the chamber, the chamber can be emptied. Further, by using either the upper or lower valve outlet, the flow past the tablets changes and thereby, the concentration of detergent outlet liquid is changed. When referring to the valve being motor-controlled throughout this document, any type of valve control is meant. Therefore, a motor control is also control-based on magnetics or similar which can be used to control the throughput of a valve.

In an embodiment, the chamber comprises a lid with a valve.

Thereby, the lid can be opened to insert a tablet for cleaning the inside of the chamber. Further, the valve at the lid ensures that the air can access the valve when adding water to the chamber. Air also accesses the lid valve when content of the chamber is sucked out, e.g. through the lower valve opening.

In an embodiment, the liquid is fed to and from said chamber via pipes, such as steel pipes.

This has proven to be an efficient and hygienic way of adding or removing liquid from the chamber.

The invention further relates to a method of generating a detergent liquid by dissolving detergent tablet or tablets or detergent granulate in water in a chamber, wherein the method comprises positioning the tablets or granulate in a colander inside said chamber, adding water to said chamber.

Thereby, a very efficient dissolving process can be performed and a uniform detergent liquid is obtained. By positioning the tablets or granulate inside the colander and then adding water, it is ensured that all sides of the tablet are in contact with the liquid in the chamber.

In an embodiment, the method further comprises determining a concentration of said detergent liquid by determining said concentration by measuring the conductivity of the detergent liquid in the chamber, performing a step of dissolving if said conductivity is lower than a predefined minimum value, adding water to said chamber if said conductivity is higher than a predefined maximum value.

wherein the step of dissolving comprises heating the contents of said chamber.

Thereby, a very efficient dissolving process can be performed, and a uniform detergent liquid is obtained. Further, the intensity of the detergent liquid can be ensured at a predefined level.

In an embodiment, the step of dissolving further comprises the step of creating a circulation of liquid in said chamber.

Thereby, a simple method of creating circulation is obtained.

In an embodiment, the step of creating circulation is performed by pumping said liquid out of said chamber, through a channel and back into said chamber.

By pumping, the circulation can easily be controlled.

In an embodiment, the step of heating is performed by heating said liquid in said channel.

Thereby, the heating of the liquid can easily be made and easily implemented in the system.

BRIEF DESCRIPTION OF DRAWINGS

The invention is explained in detail below with reference to the drawings, in which.

DETAILED DESCRIPTION OF DRAWINGS

Figure 1:
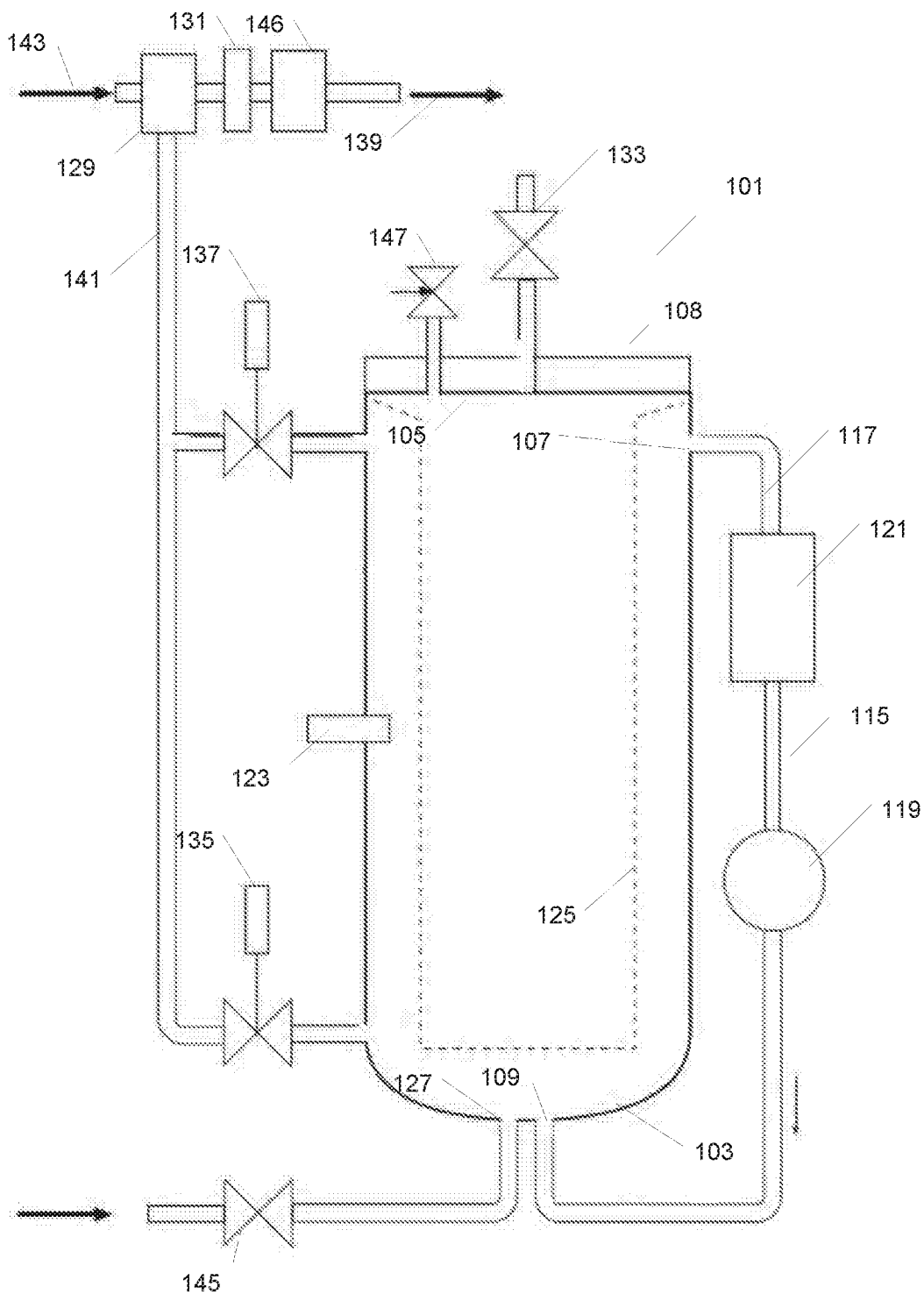
FIG. 1 illustrates an embodiment of a system for dissolving detergents according to the present invention.

FIG. 1 illustrates an embodiment of a system for dissolving detergents according to the present invention. The system 101 comprises a chamber 103, and a channel 117 is connected to the chamber via an input opening 109 and an output opening 107. A pump element 119 (e.g. a centrifugal pump or an eccentric screw pump) is connected to said channel 117 and thereby liquid can be sucked from the output opening 107 of the chamber 103, through the channel 117 and into the input opening 109 of the chamber 103.

Further, a heating unit 121 (e.g. a water flow heater) is present at the channel 117 for heating the liquid being circulated through the channel 117.

The chamber further comprises an opening 105 with a lid 108. The lid comprises a valve 133, and detergent can be added to the chamber by opening the lid and positioning detergent tablets or granulate inside the chamber. A colander 125 is positioned inside the chamber for receiving and carrying the tablets or granulate until it is dissolved. The positioning of the tablet or granulate in a colander ensures that all sides of the tablet or granulate are constantly exposed to the liquid and liquid flow in the chamber.

Further, a water inlet 127 is positioned at the bottom of the chamber for connecting the chamber to a water supply, whereby water can be transferred to the chamber. The water can enter into the chamber, when the valve 145 is open.

The chamber further comprises a measurement device 123 for measuring the conductivity of the liquid inside the chamber. Initially, the tablet or granulate is not dissolved in the water, but as time passes and as the dissolving takes place, the conductivity increases, and a detergent liquid is generated. The pump and the heating element heat the liquid and create flow in the liquid, whereby the dissolving process becomes more effective, and a more uniform detergent liquid is generated in the chamber.

For transporting the detergent liquid out of the chamber, the chamber comprises two outlets, a motor-controlled valve outlet 135 positioned at the lower part of the chamber and a motor-controlled valve outlet 137 positioned at the upper part of the chamber, respectively. The top outlet 137 is used when tapping detergent liquid and thereby it is ensured that the water added through the lower water inlet 127 passes most of the colander filled with tablet, and this increases the dissolving process. The lower outlet 135 is used when emptying the chamber, e.g. when all tablets have been dissolved, and new tablets have to be added.

In a specific embodiment, the chamber is a steel tank, and inlet and outlet channels are steel pipes welded to the steel tank.

A system including the components can be used for dissolving detergent tablets or granulate by positioning the granulate inside the colander and then, water is transferred into the tank. The dissolving process is expedited by circulating and heating the content via the channel 117. By measuring the conductivity of the liquid inside the chamber, the dissolving process can be monitored, and when a sufficient dissolution has occurred (e.g. almost saturated), the detergent liquid is fed from the chamber to be mixed with water, e.g. to generate a detergent liquid to be used for cleaning.

In the figure, it is illustrated that the detergent 141 from the chamber is mixed with water 143 at a mixing unit 129, such as a venturi nozzle, whereby the output liquid 139 of this mixing unit is a dissolution of the detergent liquid to be used for e.g. cleaning by the cleaning staff. Further mixing is not necessary. Further, a measurement device 131 for measuring conductivity of the output liquid 139 of the mixing unit is used for ensuring the correct mixing ratio of detergent liquid from the chamber with water. Finally, in 146, compressed air can be added to the output liquid. This should be added after ensuring the correct mixing ratio since this compressed air may otherwise result in incorrect measurements by the measurement device 131.

Further, a safety valve 147 is added to the lid 108 of the chamber due to pressures that may occur inside the chamber in the dissolving process.

Figure 2:
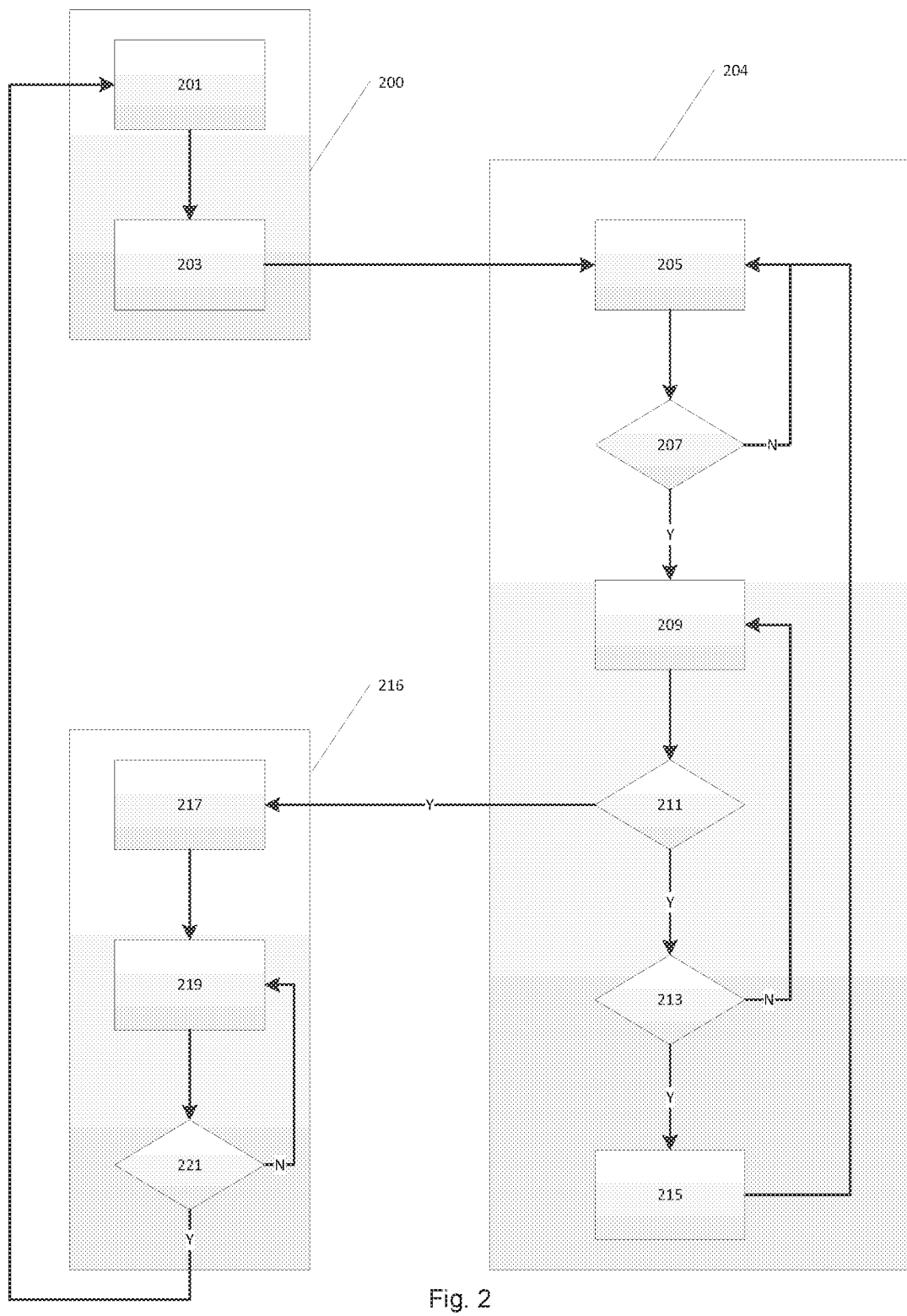
FIG. 2 illustrates a method of dissolving detergents.

FIG. 2 illustrates a method of dissolving detergents using a system explained in FIG. 1.

Initially, a start-up phase 200 is performed as described in the following.

In 201, the chamber 103 (see FIG. 1) is empty and neither detergent tablets nor detergent granulate is present in the chamber 103. Further, all outlet and inlet valves 135, 137, 133 and 145 are closed. Before starting the process, the detergent tablets or granulate is inserted in the chamber 103 of the system by opening the lid 105 and positioning the tablet or granulate in the colander 125. In an embodiment, the colander is completely filled with tablets.

Next, in 203, the valve 133 at the lid 108 is opened ensuring that air can get out of the chamber as water is added through the water inlet 127 and after opening the valve 133 at the lid 108, the valve 145 at the water inlet 127 is opened. When sufficient water has been added to the chamber (e.g. the chamber is completely filled), the water inlet valve 145 is closed as well as the valve 133 at the lid 108.

Now both detergent tablet/granulate and water are present in the chamber, and the dissolving process 204 to generate the detergent liquid can be started.

In 205, this is done by circulating the content of the chamber through the channel 117 by activating the pump element 119. Further, the liquid content of the chamber is heated by activating the heating unit 121 at the channel 117. An alternative way of creating circulation in the chamber without the channel, could be to position a swirling unit inside the chamber, such as a propeller or the like. Further, the chamber itself could comprise means for heating the content of the chamber, e.g. in the walls of the chamber.

In 207, it is checked whether the measured conductivity is above a predefined value. If not (N) (the tablet or granulate has not been dissolved sufficiently in the water), the circulation continues in 205. If it is above the value (Y), then in 209, the top valve outlet 137 is opened and also the water inlet valve 145, whereby water can enter through the water inlet, and liquid detergent can leave the chamber to be delivered for use, e.g. to a mixing unit 129.

The liquid from the chamber is mixed with water at the mixing unit 129, whereby a necessary dissolution of the detergent liquid for performing the actual cleaning is obtained. This is ensured by measuring the conductivity of the output of the mixing unit by the measurement device 131 and controlling the valve outlet 137 accordingly.

This measurement is made in 211 and if the measured value equals or is above a predefined value (N), then the process of delivering liquid detergent from the chamber continues in 209. If the measurement becomes lower than a predefined value (Y), then in 213, the water inlet valve 145 and the valve outlet 137 are closed, and a circulation process is started for a predefined period. Then in 215, a new measurement is made, and if the measured value equals or is above the predefined value (Y), then the process of delivering liquid detergent from the chamber continues in 209. If the measurement is still lower than a predefined value (N), then an emptying process 216 is started.

The emptying process comprises the step 217 of stopping any pending circulation and heating by stopping pump element 119 and heating unit 121. Next, in 219, the lower outlet valve 135 og 133 is opened and remaining detergent liquid leaves via the venturi nozzle. In 221, it is checked whether the chamber is empty, e.g. when the output liquid 139 is solely water, which is determined by the measured conductivity measured by the measurement device 131. The emptying continues (N) until the chamber is empty (Y), and then a new filling process 200 can be started.

Figure 3:
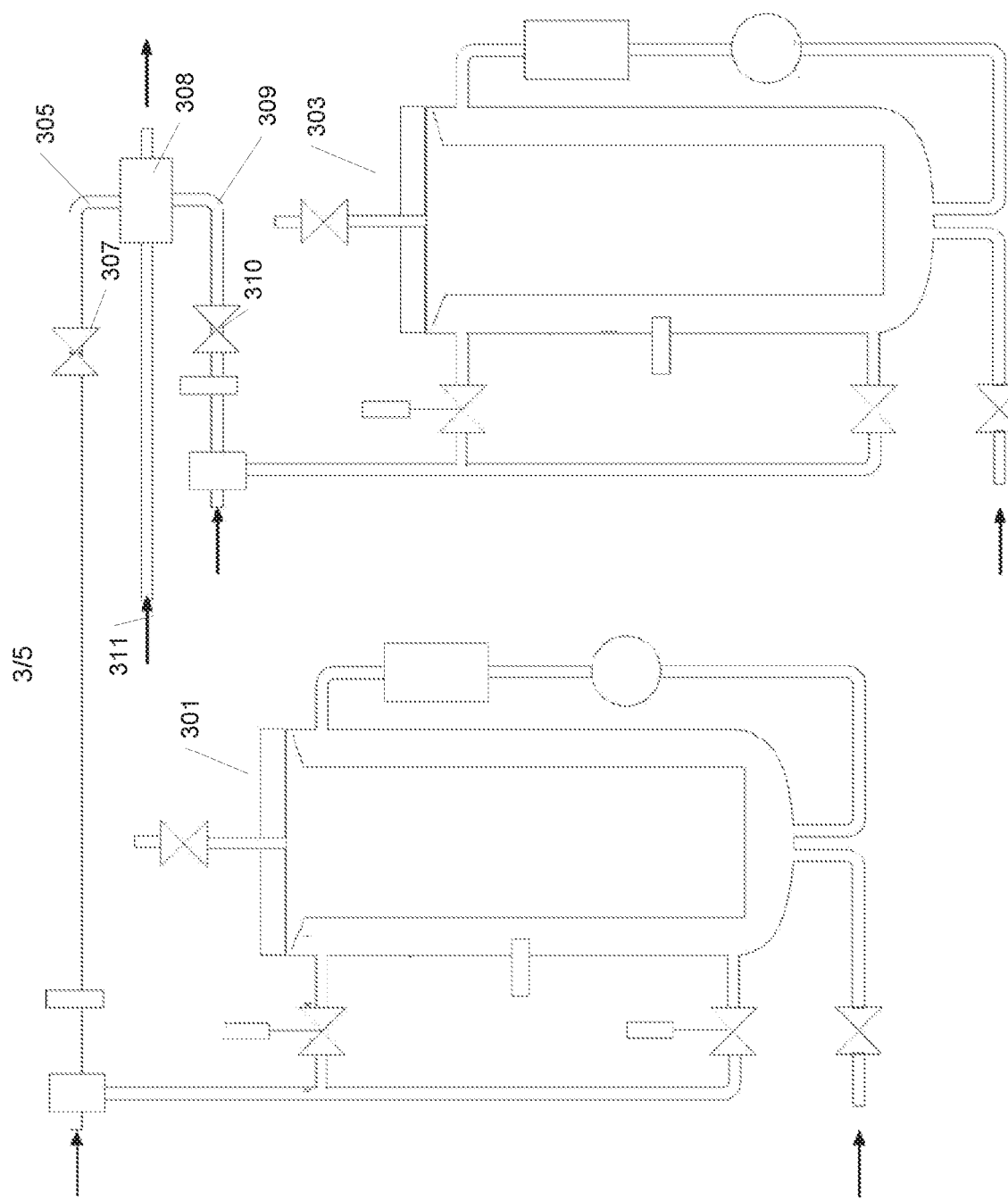
FIG. 3 illustrates an alternative embodiment of a system for dissolving detergents according to the present invention.

FIG. 3 illustrates an alternative embodiment of a system for dissolving detergents according to the present invention. In this system, two systems being a first system 301 and a second system 303 are positioned in series, each system being similar to the system illustrated and explained in FIG. 1. In this embodiment, the output liquid 305 delivered as output of the first system 301 is fed to a mixing unit 308 via a valve unit 307. Similarly, the output liquid 309 delivered as output of the second system 303 is also fed to the mixing unit 308 via a valve unit 310. Further, water 311 is fed to the mixing unit 308 and by combining output liquid from two separate systems, it is possible to mix different types of detergent liquid. Alternatively, a possibility would be to either use detergent liquid from a first system in a cleaning phase and or to use detergent liquid from the other system in a sterilisation phase, e.g. while the first system is being emptied.

Figure 4:
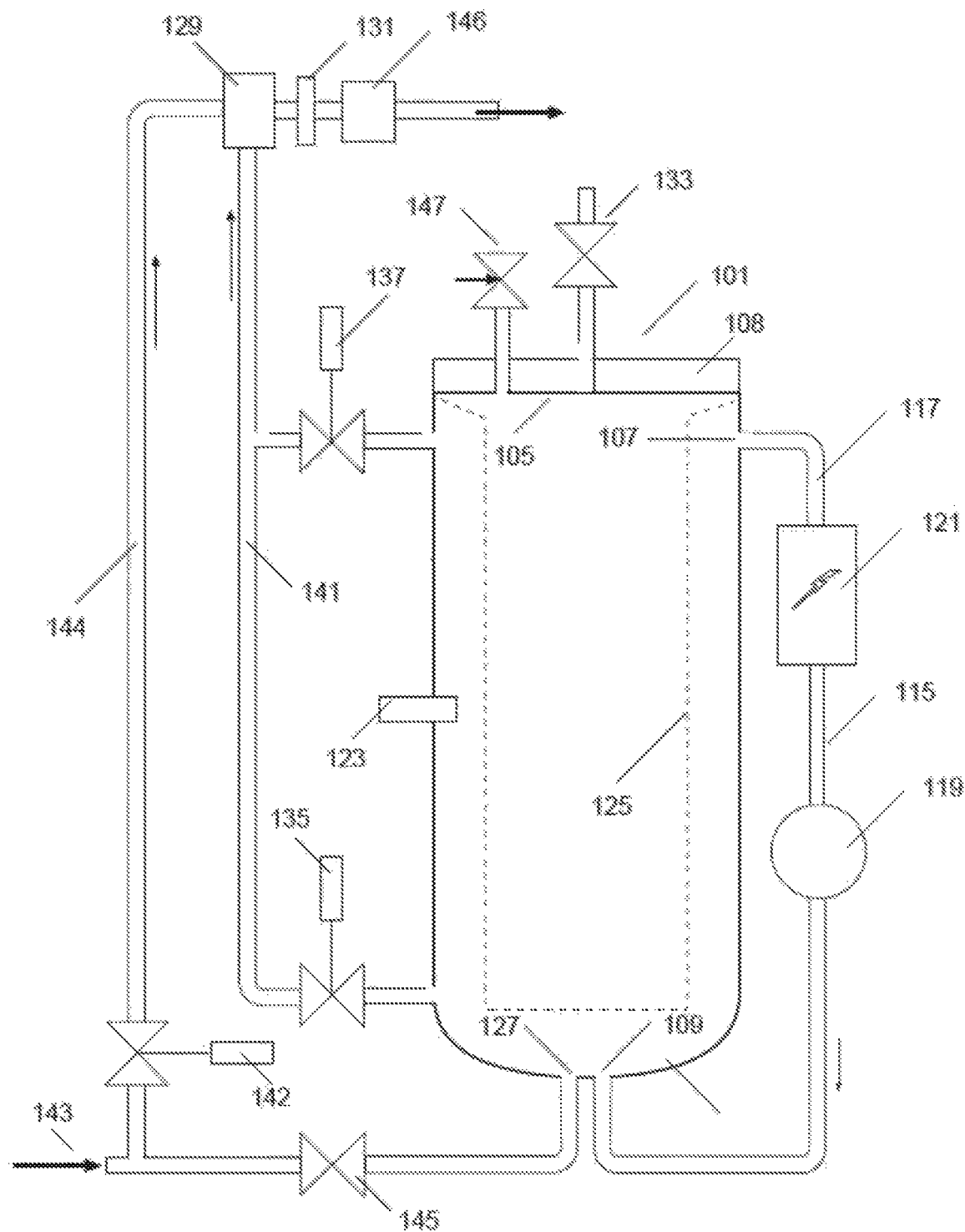
FIGS. 4 and 5 illustrate the embodiment of FIG. 1 with modifications.

FIG. 4 illustrates the embodiment of FIG. 1 with modifications. Here, the water 143 is led into the chamber 101 and thereby supports the circulation thus obtaining a more powerful flow around the tablets or the granulate in the colander, whereby these are dissolved faster. This could result in that the concentration of the detergent received by the mixing unit 129 is too high, but this can be controlled via valve 142 controlling the amount of water delivered to the mixing unit via the channel 144.

Figure 5:
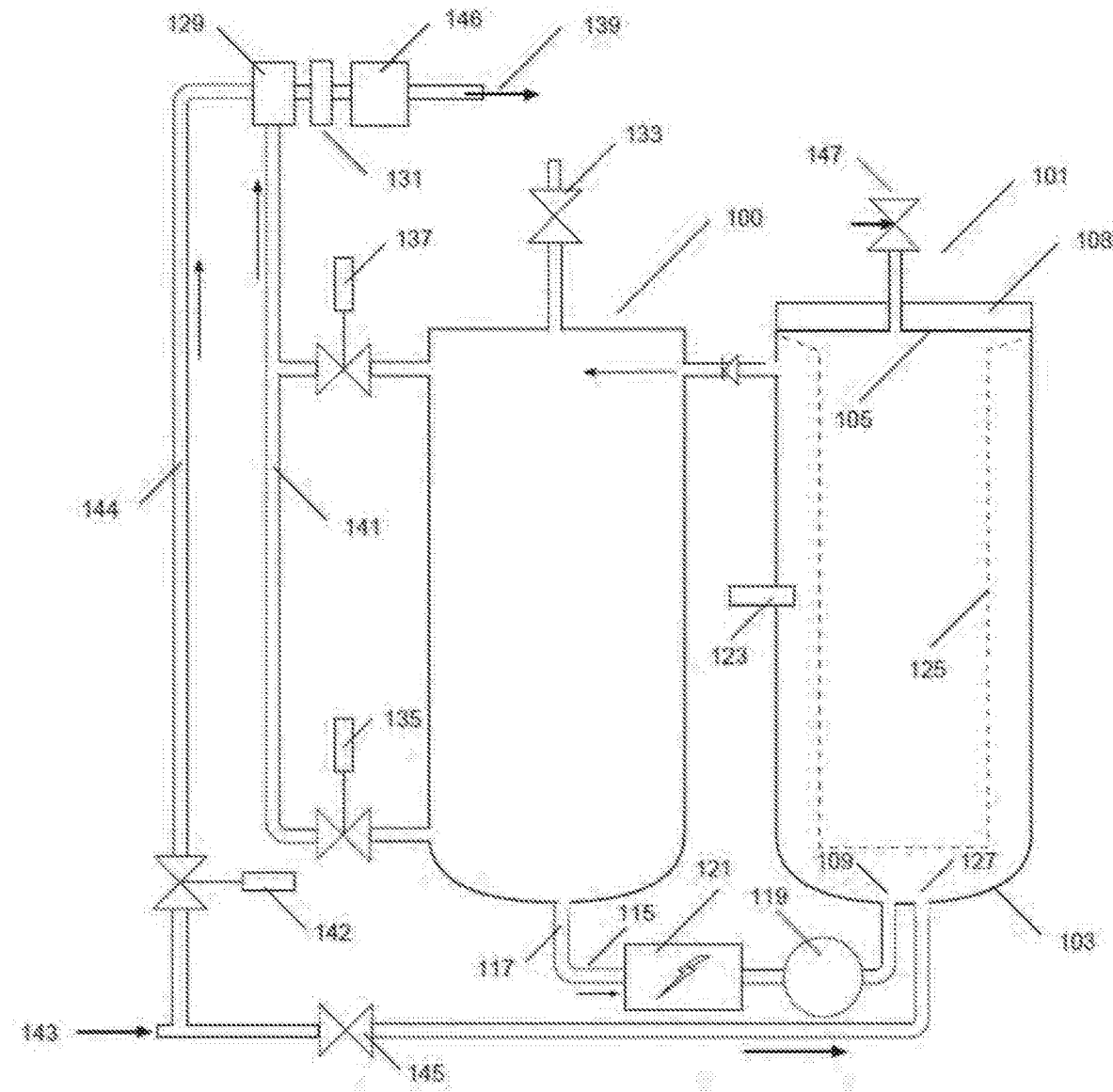

FIG. 5 illustrates the embodiment of FIG. 1 with modifications. Here, a buffer chamber 100 is connected to the chamber 101, whereby the capacity of the system is the capacity of both chambers, and more detergent liquid can be present in the system which is relevant when larger amounts of detergent are needed. The circulation to facilitate the dissolving process is made by circulating liquid from one chamber to the other. Similar effect could be obtained by increasing the volume of the chamber 101.

The invention claimed is:

1. A system for dissolving solid detergent in the form of tablets or granulate in water and thereby creating a detergent liquid, said system comprising:
    a chamber for dissolving said solid detergent while continuously submerged in a pool of water inside the chamber, comprising an interior space having an insertion opening that is closable by a cover, the insertion opening for receiving said solid detergent and being closable by the cover prior to the dissolving of the solid detergent in the water to create the detergent liquid, said chamber having inner walls that define the interior space,
    a water inlet positioned at the bottom of the chamber for connecting the chamber to a water supply, with the water inlet being coupled to a water inlet valve that permits the entry of water into the chamber when the water inlet valve is open and preventing entry of water into the chamber when the water inlet valve is closed; and
    a colander positioned inside the chamber for carrying said solid detergent, wherein said colander ensures a flow of water around the solid detergent and that all sides of the solid detergent will be constantly exposed to water in the chamber and water flow in the chamber, when said chamber is filled with water and, during the dissolving of the solid detergent, the solid detergent and water turn into a detergent liquid;
    a safety valve coupled to the chamber for reading pressure inside the chamber and for opening when pressure inside the chamber exceeds a limit;

a measurement device positioned in the inner space of the chamber inside the pool of water for measuring the conductivity of the detergent liquid in the chamber to determine when the concentration of the detergent in the water is sufficient to permit release of concentrated detergent from the system; and a detergent liquid outlet positioned at the upper part of the chamber that is coupled to a valve that permits detergent liquid to exit the chamber when the valve is opened and that prevents detergent liquid from exiting the chamber when the valve is closed, wherein dissolving of the solid detergent in the pool of water is monitored based upon the measured conductivity of the liquid detergent by the measurement device, which is submerged in the pool of water.

2. A system according to claim 1, further comprising a circulation unit including:

a circulation channel input opening and output opening associated with the chamber that is separate from the water inlet and the detergent liquid outlet of the chamber;

a circulation channel connected between said circulation channel input opening and circulation channel output opening; and a pump element for sucking liquid from the circulation channel output opening of the chamber, through the circulation channel and into the circulation channel input opening of the chamber.

3. A system according to claim 2, further comprising: a heating unit for heating the liquid in said chamber.

4. A system according to claim 3, wherein said heating unit is coupled to the circulation channel and adapted for heating the liquid in said chamber by heating liquid passing through said circulation channel.

5. A system according to claim 1, wherein the system further comprises a mixing unit for mixing the detergent liquid from the chamber with water.

6. A system according to claim 5, wherein said system further comprises another measurement device for measuring the conductivity of the liquid from the mixing unit.

7. The system of claim 5, wherein the mixing unit is a venturi nozzle.

8. A system according to claim 1, wherein both the outlet valve and the water inlet valve are motor controlled.

9. A system according to claim 1, wherein the cover of the chamber includes the safety valve and another valve that is opened during the entry of water into the chamber through the water inlet to permit air in the chamber to escape and closed after the chamber is filled with water.

10. A system according to claim 1, wherein liquid is fed to and from said chamber via pipes.

11. The system of claim 10, wherein the pipes are steel pipes.

12. A system according to claim 1, further comprising a circulation unit that comprises:

a circulation channel input opening and output opening associated with the chamber, with the circulation channel input opening being separate from the water inlet;

a circulation channel connected to the circulation channel input opening and circulation channel output opening; and a pump element for sucking liquid from the circulation channel output opening of the chamber, through the circulation channel and into the circulation channel input opening of the chamber.

13. A system according to claim 12, further comprising a heating unit for heating the liquid in said chamber coupled to the circulation channel.

14. The system according to claim 1, wherein the inner space of the chamber includes a space between the water inlet valve and the outlet valve.

15. The system according to claim 1, wherein the water inlet is positioned below the chamber and the colander.

16. A method of generating a detergent liquid by dissolving solid detergent in water in a pool of liquid in a chamber, wherein the method comprises using a system having a chamber with an insertion opening for dissolving solid detergent while submerged in a pool of liquid in the chamber, a water inlet positioned at the bottom of the chamber, a colander inside the chamber for carrying the solid detergent, a measurement device positioned inside the chamber inside the pool of liquid for measuring conductivity of the detergent liquid in the chamber to determine when the concentration of the detergent in the liquid is sufficient to permit release of concentrated detergent from the system, and a detergent liquid outlet positioned at an upper part of the chamber according to claim 2 and further comprises the steps of:

positioning solid detergent in said colander inside said chamber through the insertion opening of the chamber, whereby said colander ensures a flow of liquid around the solid detergent and that all sides of the solid detergent are constantly exposed to the liquid and liquid flow in the chamber, adding water to said chamber via the water inlet to submerge the solid detergent in the pool of liquid inside the chamber, closing the insertion opening of the chamber with a cover;

determining a concentration of said detergent liquid by measuring the conductivity of the detergent liquid in the chamber using the measurement device while the measurement device is submerged in the pool of liquid inside the chamber, performing a step of dissolving if said conductivity is lower than a predefined minimum value, adding water to said chamber if said conductivity is higher than a predefined maximum value.

17. A method according to claim 16, wherein the step of dissolving comprises heating the contents of said chamber with a heating unit.

18. A method according to claim 16, wherein the step of dissolving comprises the step of creating a circulation of liquid in said chamber via the circulation unit.

19. A method according to claim 18, wherein the step of creating circulation is performed by pumping said liquid out of said chamber with a pump, through a channel and back into said chamber.

20. A method according to claim 19, further comprising a heating unit, wherein the step of heating is performed by heating said liquid in said channel.

* * * * *